United States Patent
Chen (10) Patent No.: US 6,989,792 B2
(45) Date of Patent: Jan. 24, 2006

(54) DEVICE FOR RADIO COMMUNICATION EQUIPMENT TO REDUCE ELECTROMAGNETIC ENERGY ABSORBENCY OF A HUMAN BODY

(75) Inventor: I-Fong Chen, Tao-Yuan (TW)

(73) Assignee: Auden Techno Corp., Tao-Yuan Hsien (TW)

( * ) Notice: Subject to any disclaimer, the term of this patent is extended or adjusted under 35 U.S.C. 154(b) by 466 days.

(21) Appl. No.: 10/231,099

(22) Filed: Aug. 30, 2002

(65) Prior Publication Data

US 2004/0203369 A1 Oct. 14, 2004

(51) Int. Cl.
H04B 1/38 (2006.01)

(52) U.S. Cl. .............................. 343/700 R; 455/575.5; 343/702; 343/703

(58) Field of Classification Search ............. 455/575.5, 455/67.11, 90.3, 300; 343/702, 782, 703
See application file for complete search history.

(56) References Cited

U.S. PATENT DOCUMENTS

| | | | | |
|---|---|---|---|---|
| 6,597,326 B2 * | 7/2003 | Chen | ........................... | 343/895 |
| 6,785,519 B2 * | 8/2004 | Toyoda et al. | ............. | 455/90.1 |
| 6,806,834 B2 * | 10/2004 | Yoon | ........................... | 343/702 |
| 2002/0011956 A1 * | 1/2002 | Ito | ........................... | 343/702 |
| 2003/0064761 A1 * | 4/2003 | Nevermann | ................. | 455/572 |
| 2003/0098812 A1 * | 5/2003 | Ying et al. | ................. | 343/702 |
| 2003/0107025 A1 * | 6/2003 | Okayama et al. | ........... | 252/500 |
| 2003/0193439 A1 * | 10/2003 | Park | ........................... | 343/702 |
| 2004/0150563 A1 * | 8/2004 | Oshiyama et al. | ... | 343/700 MS |

* cited by examiner

*Primary Examiner*—Simon Nguyen
(74) *Attorney, Agent, or Firm*—Troxell Law Office, PLLC (57) ABSTRACT

A device for a set of radio communication equipment to reduce electromagnetic energy absorbency of a human body, it suits especially the equipment of a mobile phone, a Blue Tooth or a PDA etc. The standing wave ratio at a point 1 is set to be higher than that at a point 2 of the first working frequency of a multi-frequency wave band, so that the SAR value can be largely lowered. In a preferred embodiment, a point 1 of the first working frequency has 880 MHz, while a point 2 has 960 MHz.

1 Claim, 10 Drawing Sheets

FIG. 1

| Frequency (MHz) | VSWR | H-Plane | | E1-Plane | E2-Plane |
|---|---|---|---|---|---|
| | | Max | Avg | (Max) | (Max) |
| 880 | 1.418 | 2.01 | 0.15 | 1.01 | 0.40 |
| 960 | 2.251 | 0.27 | -1.07 | -0.20 | -0.91 |
| 1710 | 2.042 | 0.65 | -1.77 | 1.17 | 0.22 |
| 1880 | 1.320 | 0.95 | -3.40 | 0.97 | -0.92 |

H-Plane

| channel | Rx. Frequency | Cable Loss | Horn Ant. Gain | Space Loss |
|---|---|---|---|---|
| 975 | 880.2 | -4.35 | 11.098 | -41.70 |

| Angle | 0 | 15 | 30 | 45 | 60 | 75 | 90 | 105 | 120 | 135 | 150 | 165 | 180 | 195 | 210 | 225 | 240 | 255 | 270 | 285 | 300 | 315 | 330 | 345 | Average |
|---|---|---|---|---|---|---|---|---|---|---|---|---|---|---|---|---|---|---|---|---|---|---|---|---|---|
| Spectrum | -3.19 | -2.82 | -2.82 | -3 | -2.77 | -2.35 | -2.33 | -2.49 | -2.52 | -2.54 | -2.38 | -2.26 | -2.24 | -2.54 | -2.82 | -2.66 | -2.56 | -3.03 | -3.63 | -3.84 | -3.58 | -3.47 | -3.51 | -3.56 | |
| EIRP | 31.77 | 32.14 | 32.14 | 31.96 | 32.19 | 32.61 | 32.63 | 32.47 | 32.44 | 32.42 | 32.58 | 32.70 | 32.72 | 32.42 | 32.14 | 32.30 | 32.40 | 31.93 | 31.33 | 31.12 | 31.38 | 31.49 | 31.45 | 31.40 | 32.08 |

FIG. 4

| H-Plane | | | | |
|---|---|---|---|---|
| channel | Rx. Frequency | Cable Loss | Horn Ant. Gain | Space Loss | B.S. Offset |
| 975 | 880.2 | -4.44 | 11.3 | -42.34 | 35 |

| Angle | 0 | 30 | 60 | 90 | 120 | 150 | 180 | 210 | 240 | 270 | 300 | 330 | Average |
|---|---|---|---|---|---|---|---|---|---|---|---|---|---|
| B.S. Power | -103.8 | -104 | -104.3 | -104.6 | -104.6 | -104.6 | -104.6 | -104.5 | -104.1 | -104 | -103.6 | -103.7 | -104.18 |
| Sensitivity | -104.28 | -104.48 | -104.78 | -105.08 | -105.08 | -105.08 | -105.08 | -104.98 | -104.58 | -104.48 | -104.08 | -104.18 | -104.68 |

| H-Plane | | | | |
|---|---|---|---|---|
| channel | Rx. Frequency | Cable Loss | Horn Ant. Gain | Space Loss | B.S. Offset |
| 700 | 1842.8 | -6.56 | 14.694 | -48.12 | 40 |

| Angle | 0 | 30 | 60 | 90 | 120 | 150 | 180 | 210 | 240 | 270 | 300 | 330 | Average |
|---|---|---|---|---|---|---|---|---|---|---|---|---|---|
| B.S. Power | -104.3 | -102.5 | -99.7 | -97 | -95.9 | -97.1 | -100 | -102.6 | -104.3 | -105.3 | -105.9 | -105.4 | -101.65 |
| Sensitivity | -104.29 | -102.49 | -99.69 | -96.99 | -95.89 | -97.09 | -99.9 | -102.59 | -104.29 | -105.29 | -105.89 | -105.39 | -101.65 |

| Frequency (MHz) | H-Plane | | E-Plane | |
|---|---|---|---|---|
| | Max | Avg | E1 | E2 |
| 880 | 1.22 | -0.45 | -0.58 | -0.11 |
| 960 | -1.73 | -2.52 | -0.91 | -2.28 |
| 1710 | 1.06 | -3.69 | -0.70 | 0.02 |
| 1880 | 1.24 | -3.64 | -1.37 | -0.67 |

| | H-Plane | | | |
|---|---|---|---|---|
| channel | Rx. Frequency | Cable Loss | Horn Ant. Gain | Space Loss |
| 975 | 880.2 | -4.35 | 11.098 | -41.71 |

| Angle | 0 | 15 | 30 | 45 | 60 | 75 | 90 | 105 | 120 | 135 | 150 | 165 | 180 | 195 | 210 | 225 | 240 | 255 | 270 | 285 | 300 | 315 | 330 | 345 | Average |
|---|---|---|---|---|---|---|---|---|---|---|---|---|---|---|---|---|---|---|---|---|---|---|---|---|---|
| Spectrum | -2.047 | -2.514 | -3.073 | -2.925 | -2.608 | -2.396 | -2.325 | -2.273 | -2.037 | -1.746 | -1.388 | -1.391 | -2.239 | -2.836 | -2.706 | -2.606 | -2.647 | -2.806 | -2.932 | -3.149 | -3.332 | -3.177 | -2.499 | -2.076 | |
| EIRP | 32.91 | 32.44 | 31.88 | 32.03 | 32.35 | 32.56 | 32.63 | 32.68 | 32.92 | 33.21 | 33.57 | 33.57 | 32.72 | 32.12 | 32.25 | 32.35 | 32.31 | 32.15 | 32.03 | 31.81 | 31.63 | 31.78 | 32.46 | 32.88 | 32.47 |

| H-Plane | | | | | |
|---|---|---|---|---|---|
| channel | Rx. Frequency | Cable Loss | Horn Ant. Gain | Space Loss | B.S. Offset |
| 975 | 925.2 | -4.45 | 12.008 | -42.14 | 35 |

| Angle | 0 | 30 | 60 | 90 | 120 | 150 | 180 | 210 | 240 | 270 | 300 | 330 | Average |
|---|---|---|---|---|---|---|---|---|---|---|---|---|---|
| B.S. Power | -102.6 | -102.8 | -103 | -103.1 | -103 | -103.2 | -103 | -102.8 | -102.4 | -102.1 | -102.2 | -102 | |
| Sensitivity | -102.18 | -102.38 | -102.58 | -102.68 | -102.58 | -102.78 | -102.58 | -102.38 | -101.98 | -101.68 | -101.78 | -101.58 | -102.26 |

DEVICE FOR RADIO COMMUNICATION EQUIPMENT TO REDUCE ELECTROMAGNETIC ENERGY ABSORBENCY OF A HUMAN BODY

BACKGROUND OF THE INVENTION

1. Field of the Invention

The present invention is related to a device for a set of radio communication equipment to reduce electromagnetic energy absorbency of a human body, and especially to such a device particularly suiting the equipment of a PDA, a mobile phone, a Blue Tooth etc. that can reduce electromagnetic energy absorbency of a human body.

2. Description of the Prior Art

The fast growing of the market mobile phones indicates that the mobile communication equipment has high developing potentiality. Signals from a set of radio communication equipment such as a mobile phone are transmitted mainly with specific working frequencies (for example: 900 MHZ and 1800 MHZ); however, it is studied and showed that the signal transmission with such frequencies, especially those for mobile phones often being pressed against the area near a human brain for a long time, is probable to hurt the human body. And thereby, most countries and districts establish related stipulations on safe limiting values for such communication equipment.

Taking the FCC (Federal Communication Committee of the U.S.A.) as an example, the standard safe limiting values for the specific absorption rate (SAR) of electromagnetic energy of human bodies for a mobile phone are stipulated to be under 1.6 W/kg (1.6 mW/g), i.e., the amount of radiation of electromagnetic waves born by human shall be under 1.6 watts per kg (weight of a person). In Europe, the specification (CE) of safe limiting values is 2.0 mW/g. In view that in the modern related study of medical science, when heat energy converted from electromagnetic waves is absorbed by the brain tissue of a person and accumulated in the human body to make the internal temperature of the person increased to 4.5° C. for 30 minutes, it is reported that this may hurt the nerve tissues of the human body. In some countries, the requirement on safe limiting values for the specific absorption rate (SAR) is even severer.

Figure 2:
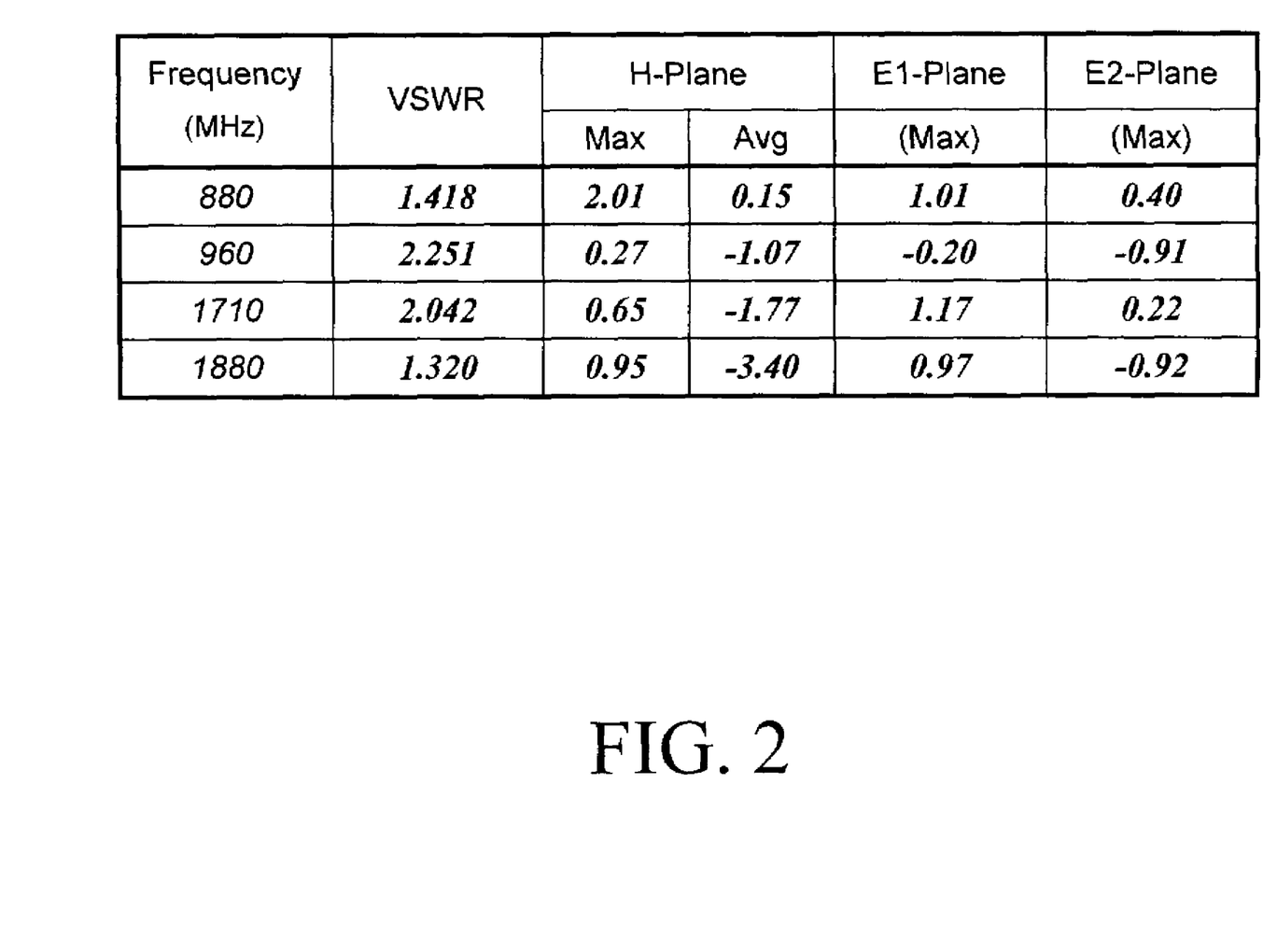
FIG. 2 is a table showing the values of different types of electromagnetic radiation fields of FIG. 1.
Figure 3:
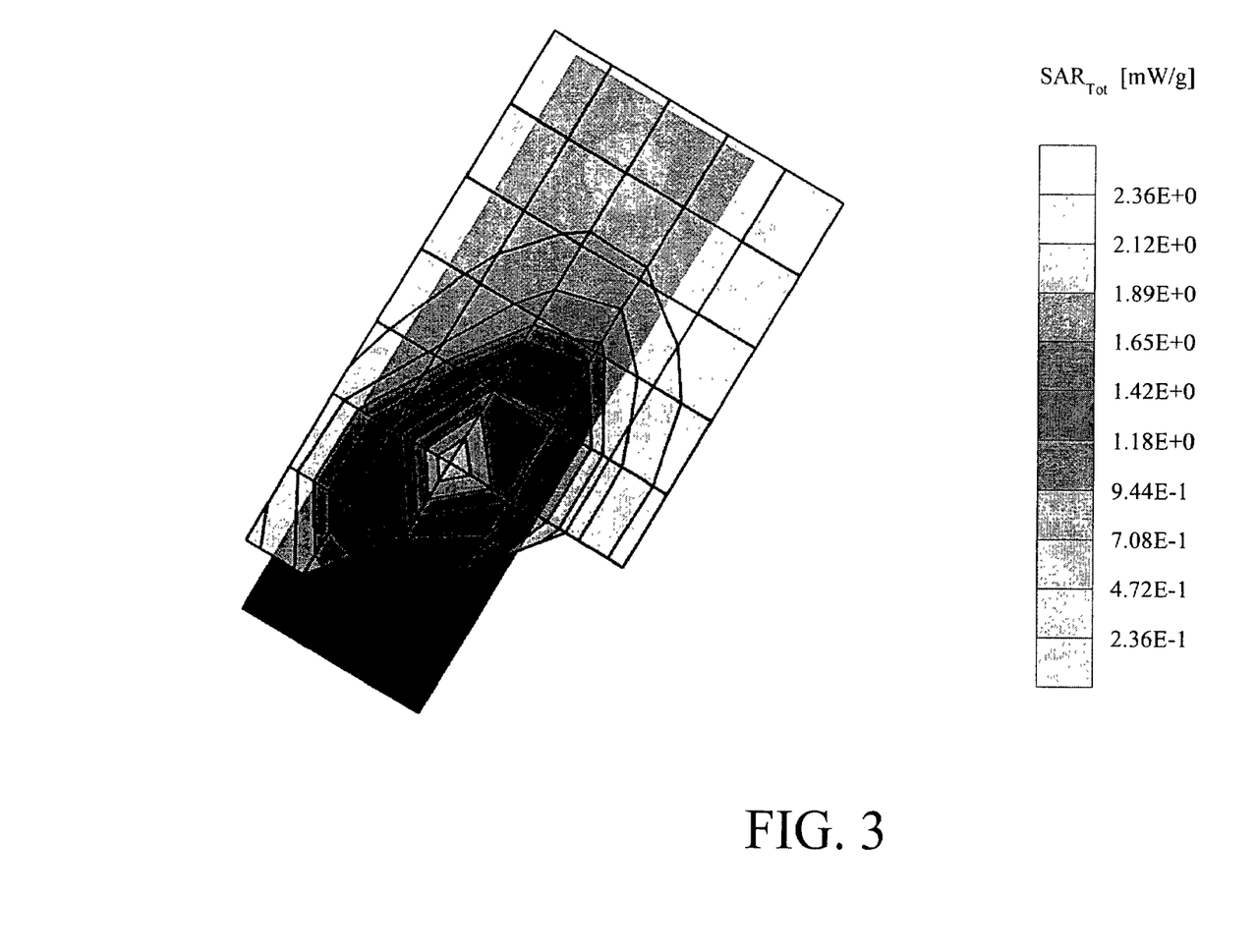
FIG. 3 is a test chart showing the effective radiated powers of FIG. 1.
Figure 4:
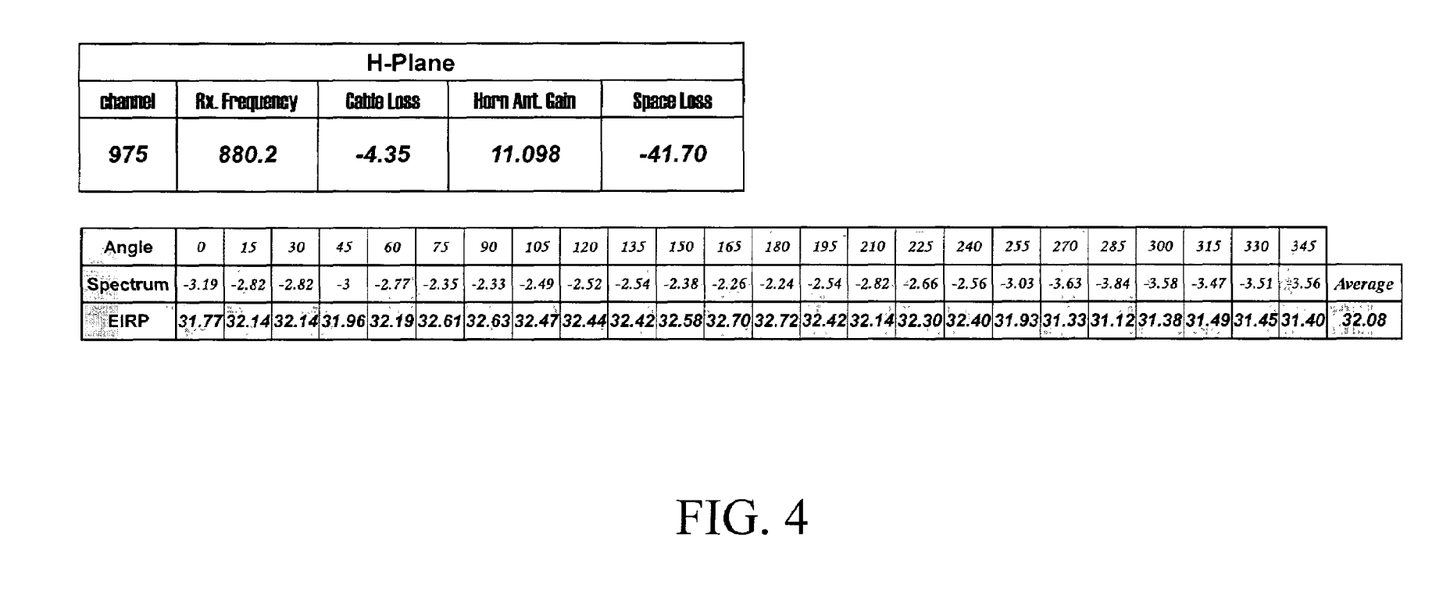
FIG. 4 is a table of the effective radiated powers of FIG. 3.
Figure 5:
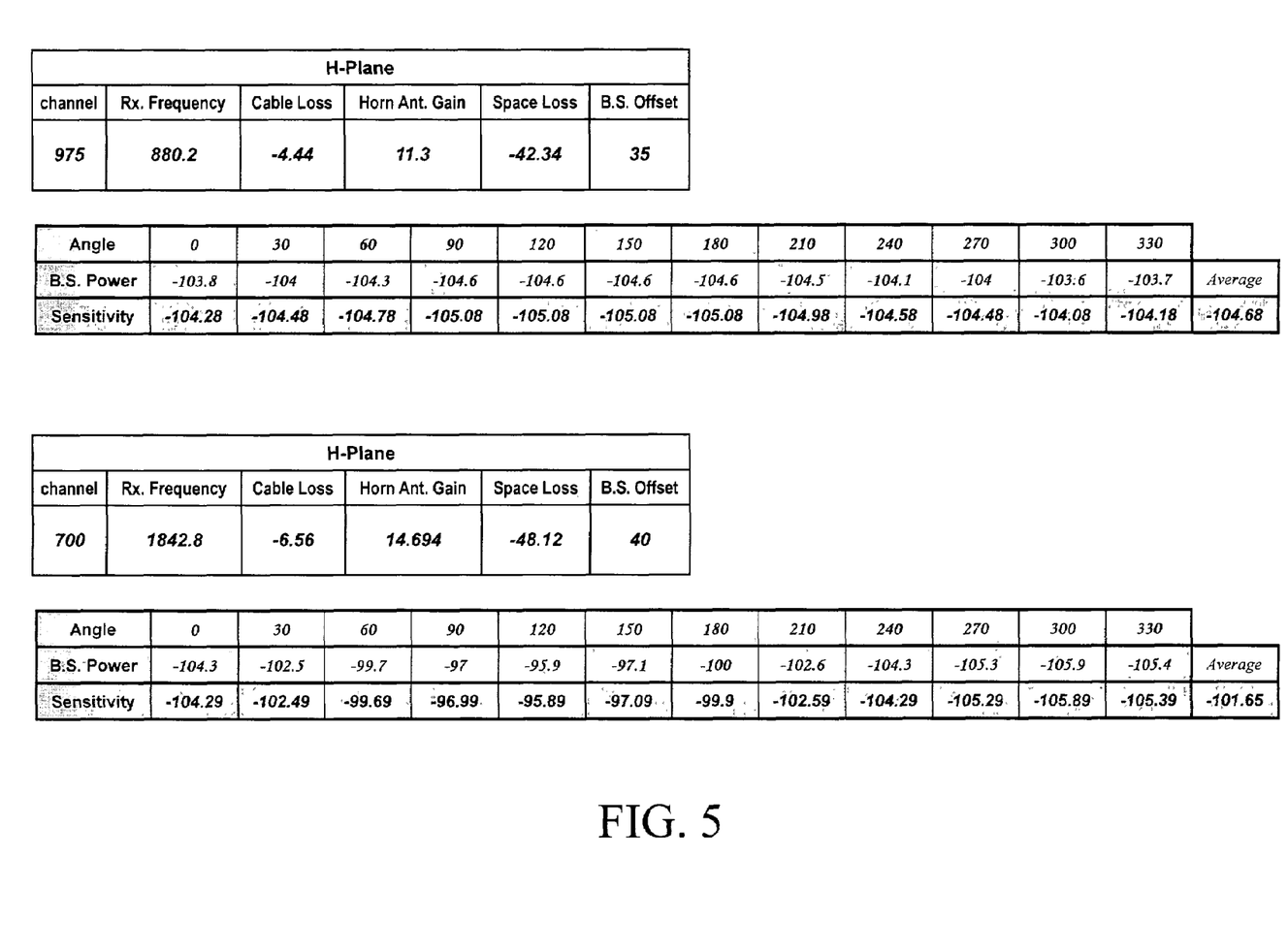
FIG. 5 is a chart of sensitivity for receiving of FIG. 1.

The mobile phones now available are hard to get the above stated safe limiting values for SAR in their stages of study and development. Taking the test on mobile phones as an example, information of the test includes a chart of standing wave voltage ratios (VSWR) (FIG. 1), a table showing the values of different types of electromagnetic radiation fields (FIG. 2), charts showing effective radiated powers (EIRP) (FIGS. 3, 4) and a chart of sensitivity for receiving (FIG. 5).

Figure 1:
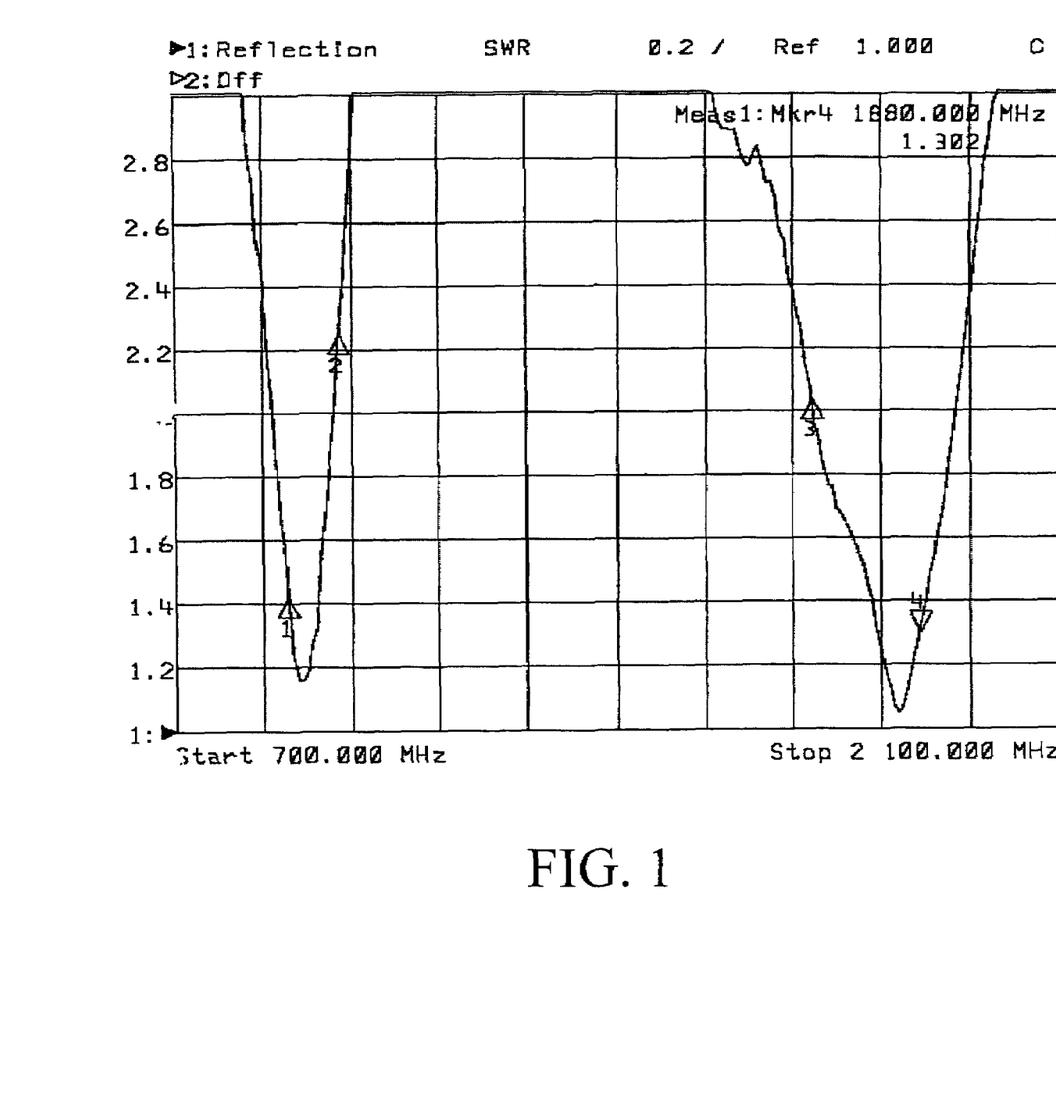
FIG. 1 is a chart showing the waveforms of a conventional mobile phone.

As shown in FIG. 1, the (SWR) standing wave ratio at a lower frequency 880 MHz is 1.418, and 2.251 at 960 MHz; the (SWR) at a higher frequency 1710 MHz is 2.042, and 1.302 at 1880 MHz. And when it is tested under the channel 975, the effective radiated power (EIRP) is 32.08 dBM (FIG. 3), the average value of sensitivity for receiving is −104.68 (FIG. 5); but the SAR will be high up to 2.27 (mW/g), i.e., the safe limiting values of American specification and European specification are both lower than this value.

SUMMARY OF THE INVENTION

Thereby, the object of the present invention is to provide a device for a set of radio communication equipment to reduce SAR in order that the SWR at a point 1 is higher than the SWR at a point 2 of the first working frequency of a multi-frequency wave band of the set of radio communication equipment. And thereby, the SAR value can be largely lowered under the conditions that the EIRP and the sensitivity of the radio communication equipment are kept with the best effort. In a preferred embodiment, the SWR at the point 1 of the first working frequency is 880 MHz, while the SWR at the point 2 is 960 MHz.

The present invention will be apparent in its novelty as well as features after reading the detailed description of the preferred embodiment thereof in reference to the accompanying drawings.

DETAILED DESCRIPTION OF THE PREFERRED EMBODIMENT

Figure 6:
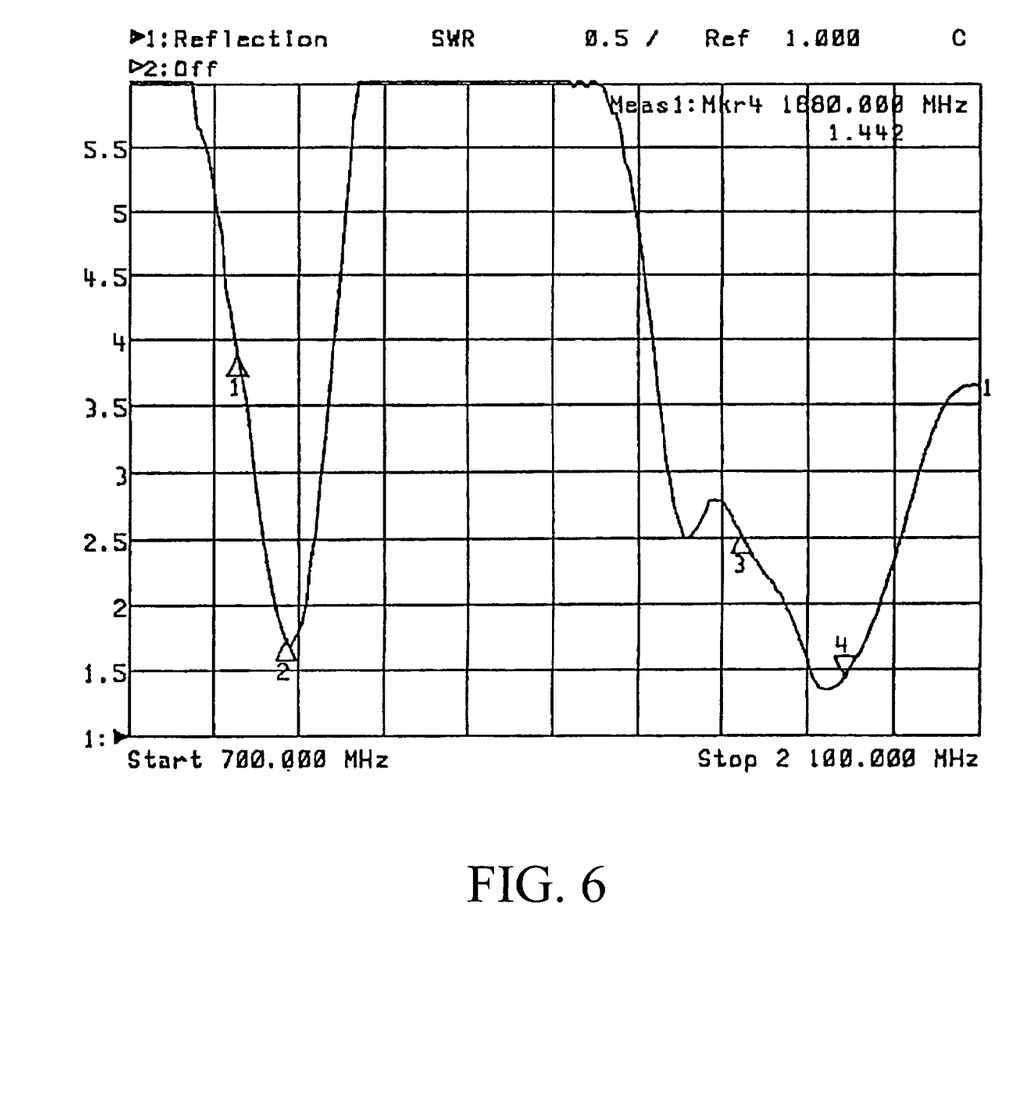
FIG. 6 is a chart showing the waveforms of a preferred embodiment of the present invention.
Figure 7:
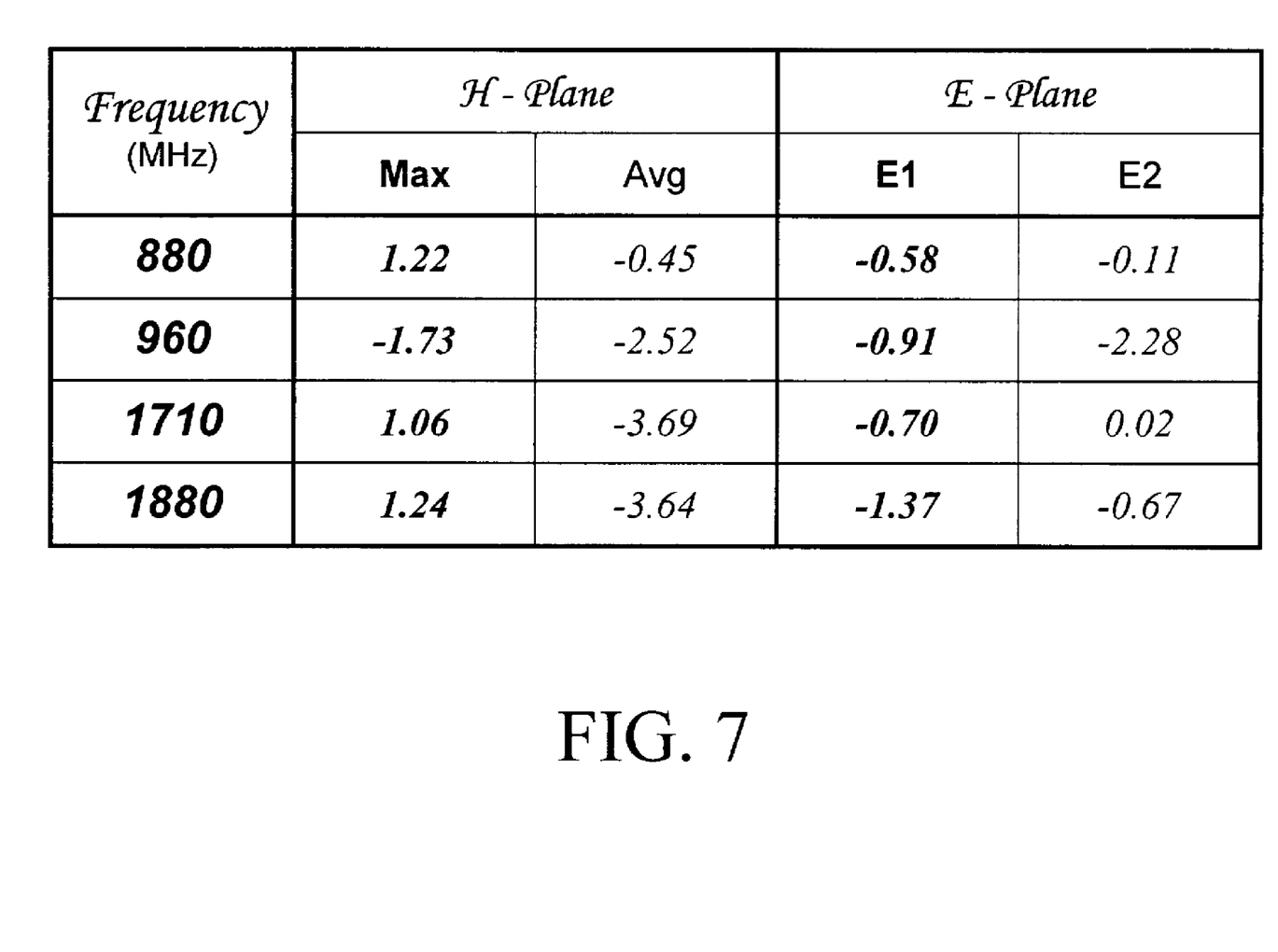
FIG. 7 is a table showing the values of different types of electromagnetic radiation fields of FIG. 6.

Referring to FIG. 6, in the preferred embodiment of the present invention shown, the first working frequency is 900 MHz, the second working frequency is 1800 MHz. In the present invention, it is mainly that the standing wave ratio (SWR) of a point 1 (880 MHz) of the first working frequency is set as 3.887, while the SWR at the point 2 (960 MHz) is set as 1.737.

Although it is the preferred state as shown in the drawing, according to tests, if the standing wave ratio of the point 1 of the first working frequency is set to be higher than that of the point 2, the value of SAR can be effectively lowered.

Figure 8:
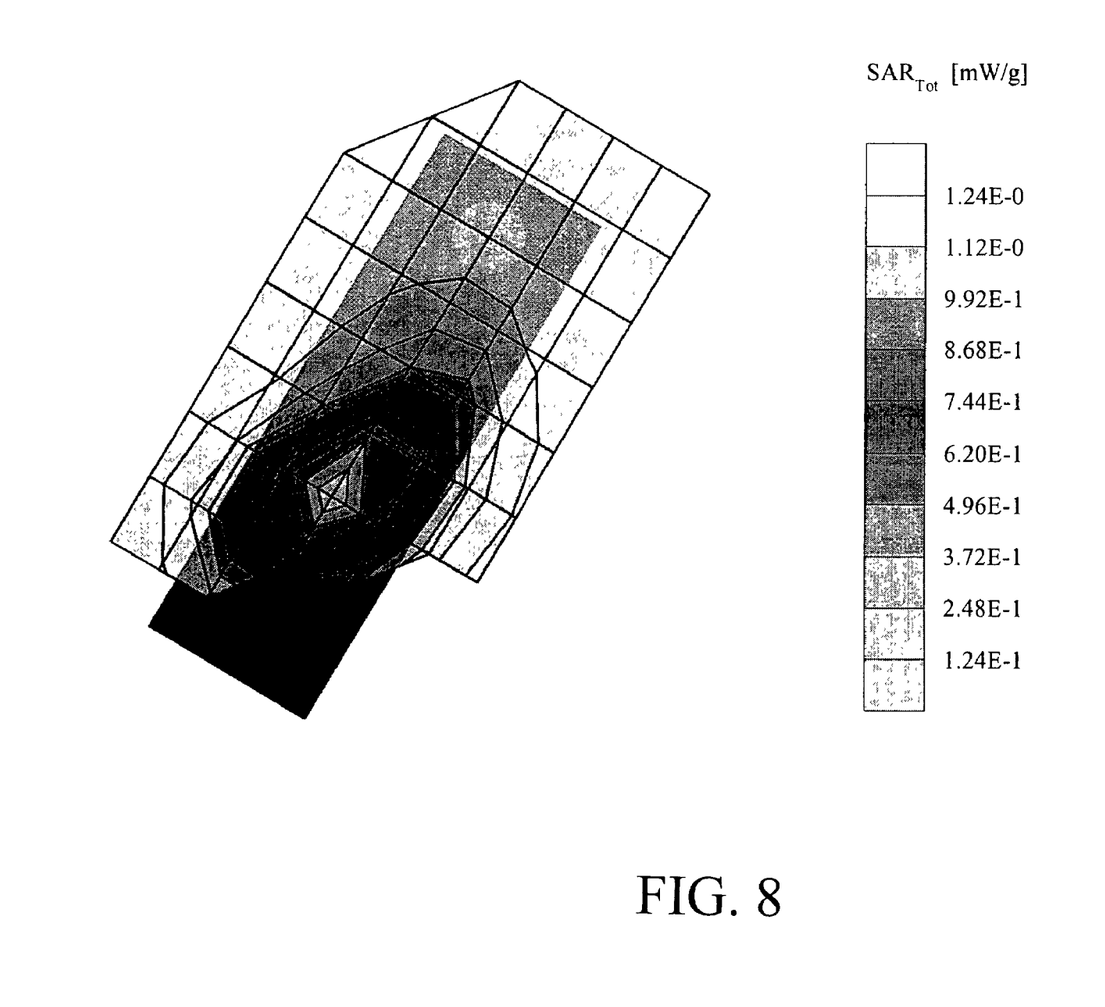
FIG. 8 is a test chart showing the effective radiated powers of FIG. 7.

Referring to FIG. 8, when the preferred embodiment shown is used on a mobile phone for testing, and when the mobile phone is held to close to an ear of a person, the value of SAR to his brain tissue can be lowered to 1.24 mW/g. This value is far lower than 1.6 mW/g stipulated in the American specification and 2.0 mW/g stipulated in the European specification.

Figure 9:
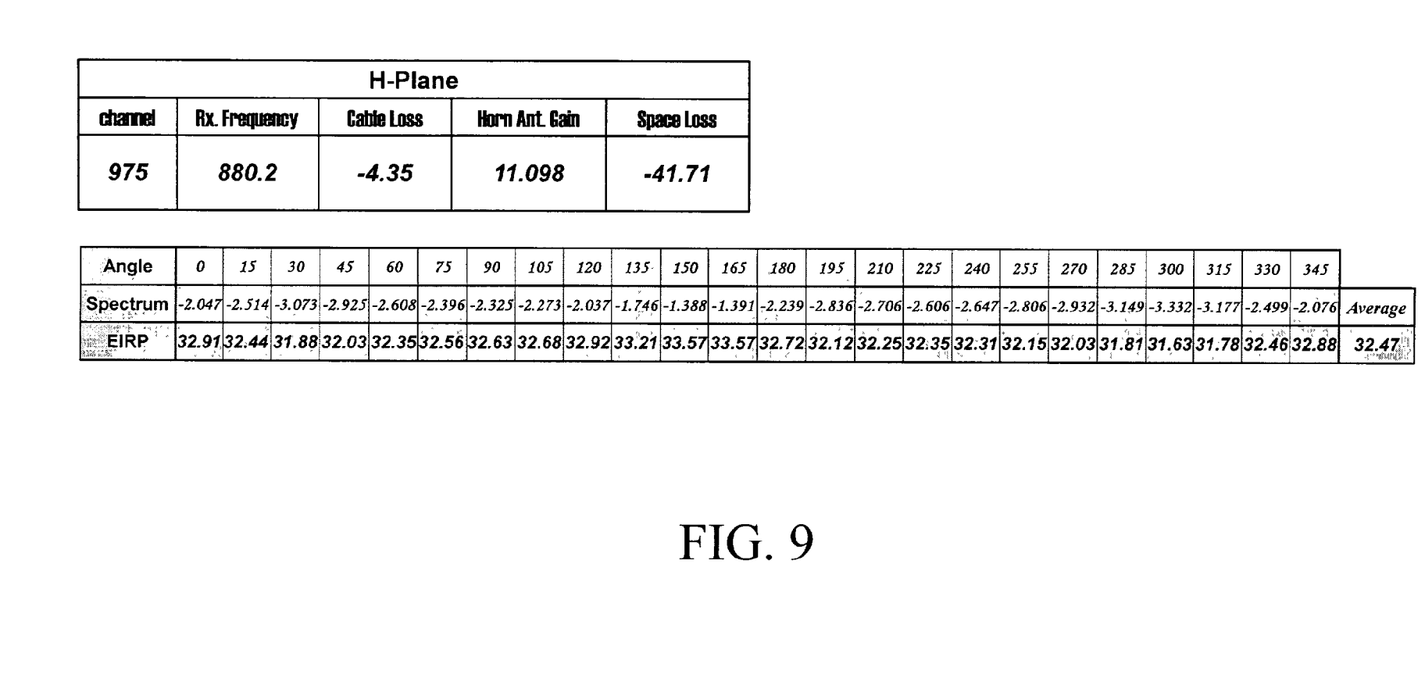
FIG. 9 is a table of the effective radiated powers of FIG. 8.
Figure 10:
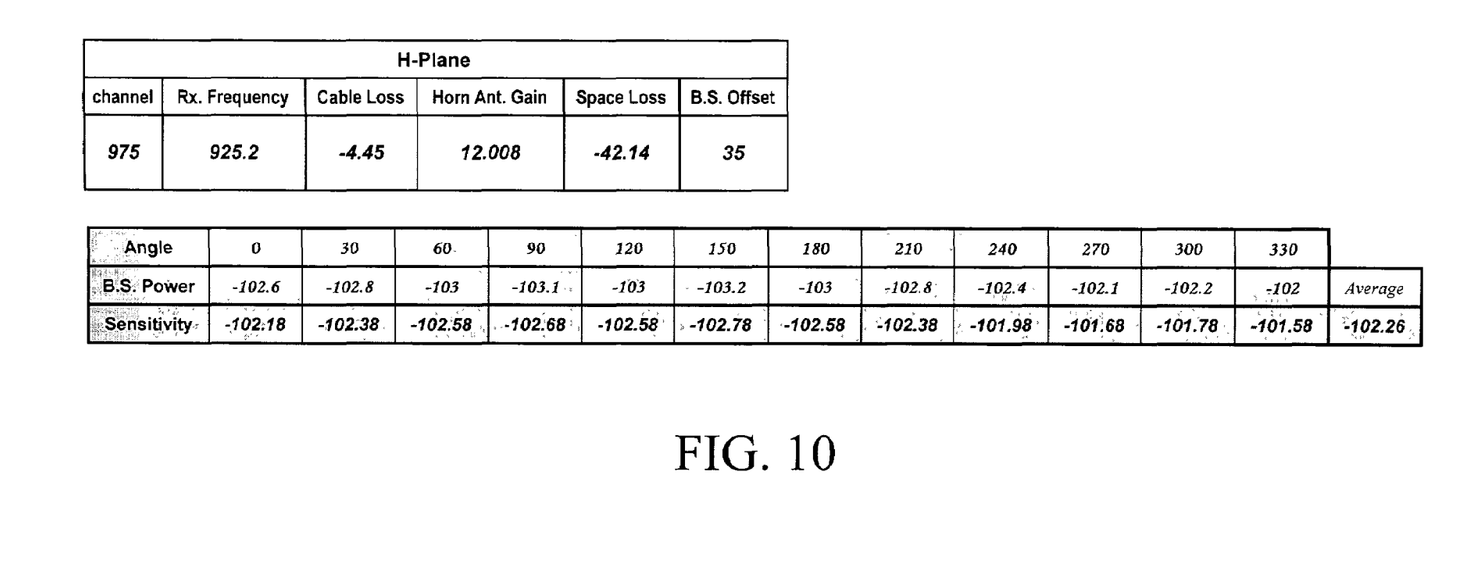
FIG. 10 is a chart of sensitivity for receiving of FIG. 6.

And under this condition, referring to FIG. 9, the effective radiated power (EIRP) of the present invention is slightly lowered from 32.08 dBM to 30.01 dBM, while the value of sensitivity is slightly lowered from −104.68 to −102.26 dBM. Although the effective radiated power and the value of sensitivity are slightly lowered, for the mobile phone as an example, its function can still be quite ideal.

Thereby, the present invention can largely and effectively reduce electromagnetic energy absorbency of a human body from radio communication equipment, not only to meet the stipulations of safe limiting values for the specific absorption rate (SAR) of most countries, but also can suit those countries stipulated with severer safe limiting values for the SAR in consideration that values of SAR may have latent probability of hurting to human bodies.

While a preferred embodiment has been known and described hereinabove only for illustrating the present invention, it will be apparent to those skilled in this art that various changes and modifications might be made without departing from the scope of the invention which is set forth in the accompanying claims. Accordingly, all such modifications and changes also fall within the scope of the appended claims.

What is claimed is:

1. A device for a set of radio communication equipment to reduce electromagnetic energy absorbency of a human body, wherein said communication equipment emits and receives signals by a multi-frequency wave band, the standing wave ratio (SWR) at a point 1 is higher than at a point 2 of a first working frequency to lower the value of specific absorption rate (SAR) thereof, wherein said point 1 of said first working frequency has 880 MHz, said standing wave ratio (SWR) at said point 1 is set as 3.887; while said point 2 has 960 MHz, said standing wave ratio (SWR) at said point 2 is set as 1.737.

* * * * *